United States Patent [19]
van der Kaay et al.

[11] Patent Number: 5,774,789
[45] Date of Patent: Jun. 30, 1998

[54] RF COMMUNICATION SIGNAL DISTRIBUTION SYSTEM AND METHOD

[75] Inventors: Erik van der Kaay, Shaker Heights, Ohio; George S. Dubovsky, Forest, Va.

[73] Assignee: Allen Telecom Inc., Solon, Ohio

[21] Appl. No.: 572,054

[22] Filed: Dec. 14, 1995

[51] Int. Cl.$^6$ .................................................. H04B 3/58
[52] U.S. Cl. .............................. 455/16; 455/14; 455/21; 455/3.3; 455/5.1
[58] Field of Search .............................. 455/3.1, 3.3, 5.1, 455/6.1, 6.3, 7, 11.1, 14, 15, 16, 20, 21, 55.1, 33.1, 66, 69, 424, 426, 446, 462, 465; 379/56, 58

[56] References Cited

U.S. PATENT DOCUMENTS

| | | | |
|---|---|---|---|
| 3,699,250 | 10/1972 | Bunting | 455/3.3 X |
| 4,476,574 | 10/1984 | Struven | 455/55.1 |
| 4,916,460 | 4/1990 | Powell | 343/853 |
| 4,941,200 | 7/1990 | Leslie et al. | 455/20 X |
| 4,941,207 | 7/1990 | Meada et al. | 455/55.1 X |
| 5,187,803 | 2/1993 | Sohner et al. | 455/55.1 X |
| 5,251,053 | 10/1993 | Heidemann | 359/145 |
| 5,321,736 | 6/1994 | Beasley | 455/15 X |
| 5,432,838 | 7/1995 | Purchase et al. | 455/55.1 X |
| 5,457,557 | 10/1995 | Zarem et al. | 379/56 X |
| 5,550,898 | 8/1996 | Abbasi et al. | 455/33.1 X |
| 5,551,057 | 8/1996 | Mitra | 455/69 X |

OTHER PUBLICATIONS

Lee Goldberg, "Broadband to the Home: Challenges on the Last Mile," Electronic Design, Oct. 2, 1995, pp. 67–82.
Lee Goldberg, "Brains and Bandwidth: Fiber Service at Copper Prices," Electronic Design, Oct. 2, 1995, pp. 51–60.
John Avery, "Standard Serves In–Building Microcellular PCS," Microwaves & RF, May 1995, pp. 8–12 and 40.
Allen Telecom Group, Inc., MicroFill® Systems Engineering Design Guide, Publication SD–1131, Jan. 1995.
Allen Telecom Group, Inc., MicroFill®, When You Have Customers in High Places, Publication SD–1106, Dec. 1994.
Allen Telecom Group, Inc., ActiveLite™ Antenna, Publication SD–1107, Dec. 1994.
Allen Telecom Group, Inc., The Secret to MicroLite®'s Coverage Success, Publication SD–1115, Jan. 1994.

*Primary Examiner*—Reinhard J. Eisenzopf
*Assistant Examiner*—Philip Sobutka
*Attorney, Agent, or Firm*—Laff, Whitesel, Conte & Saret, Ltd.

[57] ABSTRACT

A system and method for distribution of RF communication signals. First RF communication signals are downconverted in a first signal processing subsystem and transmitted to a second signal processing subsystem via twisted-pair cable. The downconverted first RF communication signals are upconverted at the second signal processing subsystem to provide recovered first RF communication signals, and the recovered first RF communication signals are transmitted via an antenna. Operating power for the second signal processing subsystem is provided from the signal processing subsystem, and the second signal processing subsystem determines the occurrence of an event and transmits autonomous information signals thereabout to the first signal processing subsystem.

32 Claims, 3 Drawing Sheets

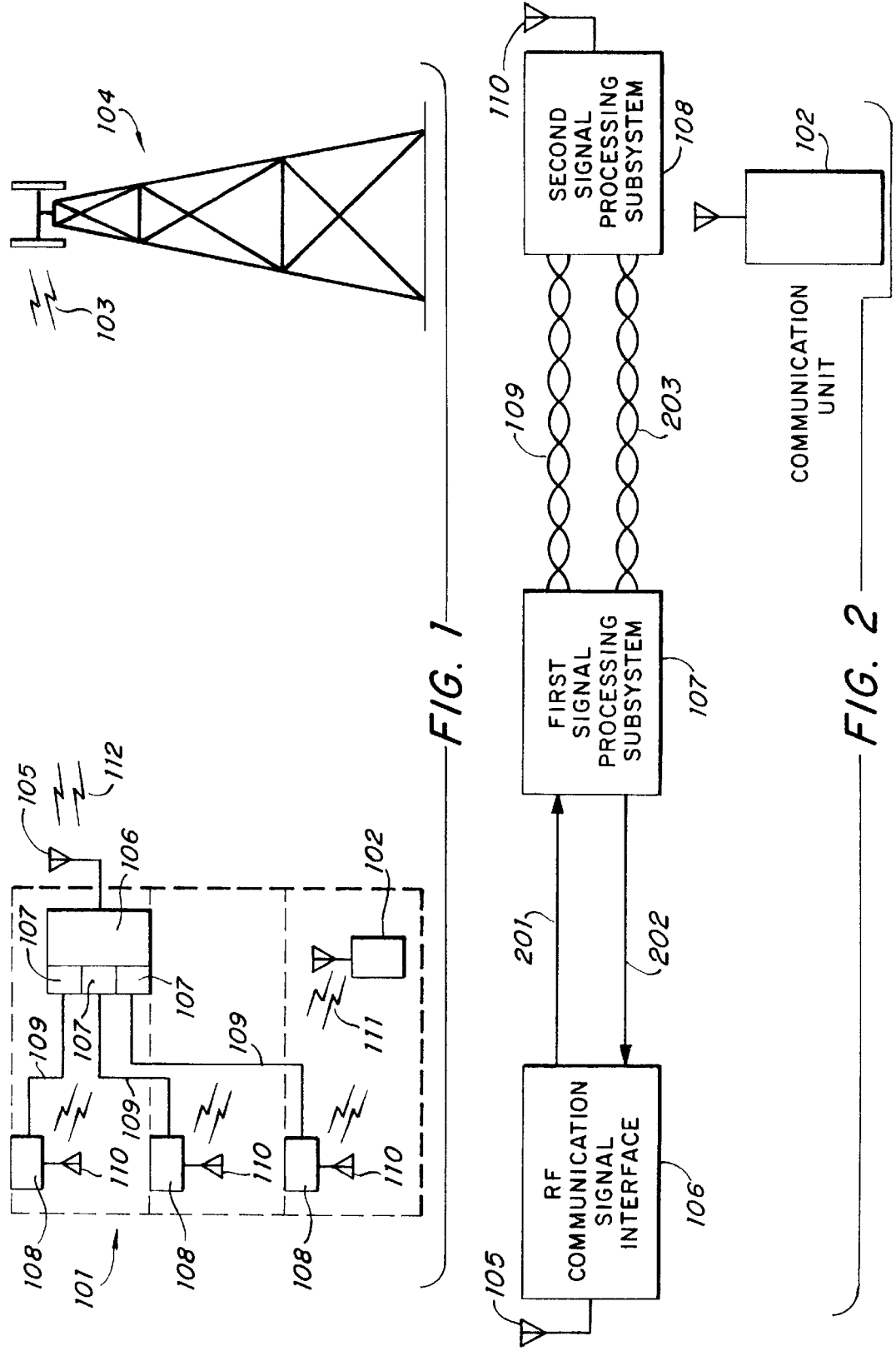

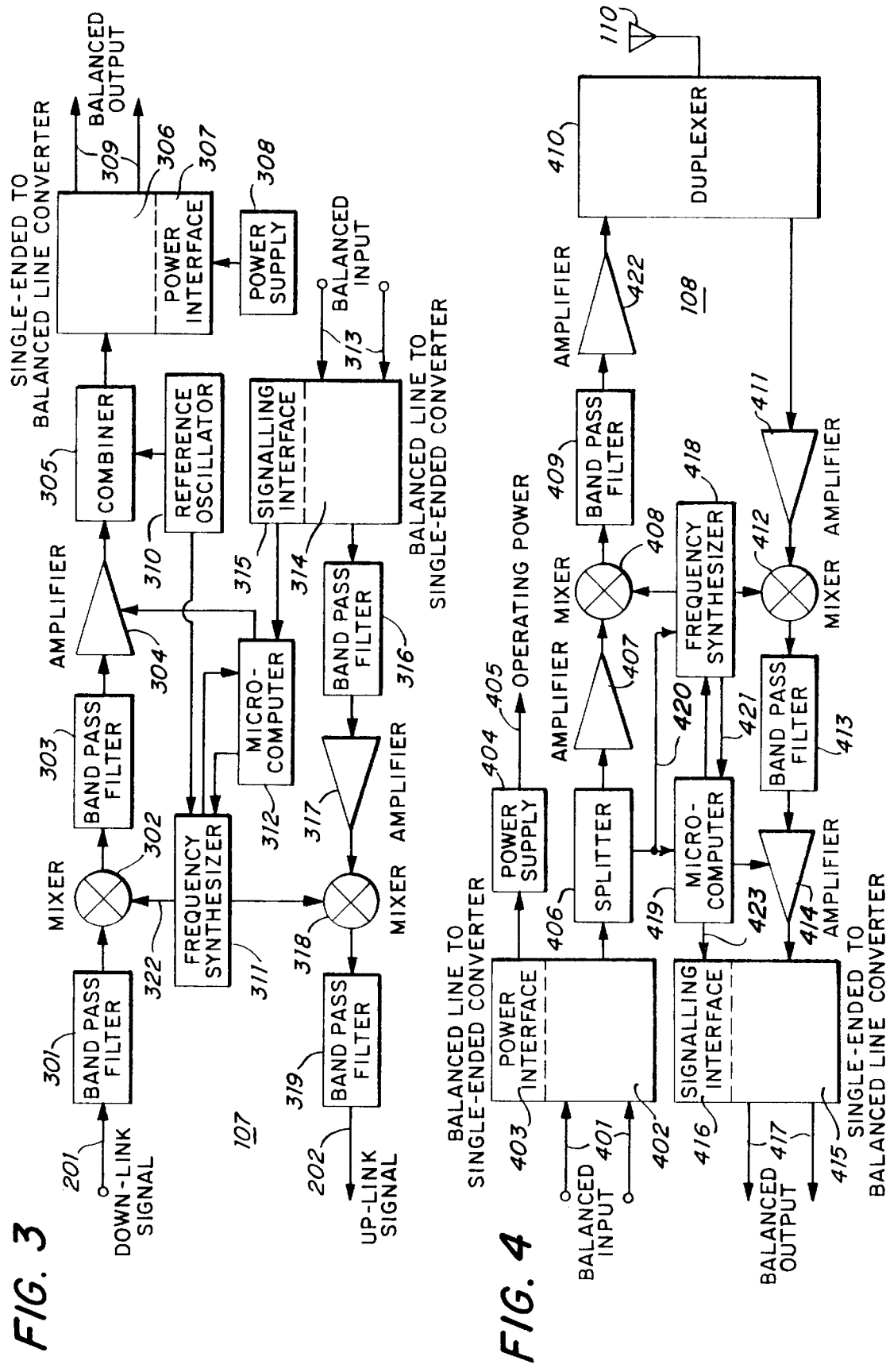

RF COMMUNICATION SIGNAL DISTRIBUTION SYSTEM AND METHOD

FIELD OF THE INVENTION

This invention relates generally to RF (radio frequency) communication systems and in particular to an RF communication system designed for operation within a structure, and is more particularly directed toward an RF communication signal distribution system and method wherein RF communication signals are frequency translated for transmission to remote retransmission sites over twisted-pair cable.

BACKGROUND OF THE INVENTION

RF communication systems that support the exchange of voice and data over long distances are well-known. Many of these known systems employ interconnection with the Public Switched Telephone Network (PSTN) to provide communication capability among landline telephone network users and RF communication system subscribers.

Such systems owe much of their popularity to the telephone-like communication capability afforded to RF system users. There are many mobile subscribers who enjoy the benefits of telephone service in their vehicles, and an ever increasing number of portable subscribers who have become accustomed to receiving telephone service wherever they go, via a portable communication unit easily stored in a briefcase or shoulder bag, or simply carried in the hand.

Unfortunately, the nature of the radio frequencies used to support this telephone-like RF communication is such that, while most cities (and not a few rural areas) enjoy blanket coverage by more than one service provider, coverage inside a structure is often inadequate. Office buildings, for example, are typically constructed so that a significant amount of metal infrastructure generally surrounds building occupants and prevents their portable communication units from receiving adequate RF signal levels for proper operation.

In response to this signal strength inadequacy, there are systems available that are designed to distribute RF communication signals within a building. In operation, such a system typically receives and amplifies incoming signals from an existing RF communication system, such as a cellular telephone system, for example, and distributes the amplified signals to antenna units scattered throughout the building via coaxial cable. Similarly, such systems typically pick up signals transmitted within the building for retransmission to the cellular telephone system.

Other known systems use fiber optic cable for in-building signal distribution, but coaxial cable and fiber optic cable are both subject to several disadvantages in installation and use. Both coaxial cable and fiber optic cable are expensive, and require termination with special connectors that are both costly and difficult to install without special tools and expertise. Fiber optic distribution systems have the disadvantage that they do not permit the exchange of other electrical signals in addition to the RF signals being distributed. Coaxial cable is both heavy and bulky, and consequently difficult for installers to carry throughout a building.

Installers also have the problem of identifying power sources near the remote antenna sites, since operating power is generally required for these units. Even after a source of power has been located, installers are still faced with the task of running power cables to the units, either behind building ceilings or walls, or through the less-attractive expedient of tacking power cables to a visible surface. The installation of additional AC line voltage cabling may also fall under UL (Underwriter's Laboratories) or National Electric Code regulations.

In addition, in a large building, the number of remote antenna units may be staggering. In order to ensure proper system operation, these remote units must be checked for operational integrity on a regular basis.

Accordingly, a need arises for a cost-effective system for distributing RF communication signals throughout a structure. The system should be easy to install, preferably by unskilled persons without special tools, and should permit an easy assessment of remote antenna unit operability.

SUMMARY OF THE INVENTION

These needs and others are satisfied by the method for distributing RF communication signals of the present invention. The method comprises the steps of, at a first signal processing subsystem, receiving first RF communication signals, downconverting the first RF communication signals to provide downconverted first RF communication signals, transmitting the downconverted first RF communication signals to a second signal processing subsystem over a first twisted-pair cable, providing operating power for the second signal processing subsystem from the first signal processing subsystem, and, at the second signal processing subsystem, upconverting the downconverted first RF communication signals to provide recovered first RF communication signals, transmitting the recovered first RF communication signals over an antenna, and determining an event occurring at the second signal processing subsystem and transmitting autonomous information signals thereabout to the first signal processing subsystem.

The step of downconverting first RF communication signals to provide downconverted first RF communication signals comprises the steps of providing the first RF communication signals to a mixer at a first input port, providing a local oscillator signal to the mixer at a second input port, providing a mixer output signal at a mixer output port, and filtering the mixer output signal to provide downconverted first communication signals in a frequency band below 100 MHz. The step of providing a local oscillator signal further comprises the steps of providing a reference signal to a frequency synthesizer and programming the frequency synthesizer to generate a local oscillator signal of predetermined frequency. A sample of the reference signal is transmitted from the first signal processing subsystem to the second signal processing subsystem for frequency control at the second signal processing subsystem. The sample of a reference signal is a sample of a reference oscillator signal at a predetermined amplitude.

In one form of the invention, the method further including the steps of measuring, at the second signal processing subsystem, the amplitude of the reference oscillator signal sample to provide a measured amplitude of the reference oscillator signal sample, and comparing the measured amplitude of the reference oscillator signal sample and the predetermined amplitude of the reference oscillator signal sample to determine an attenuation value for the twisted-pair cable.

In another aspect of the invention, the method further includes the steps of, at the second signal processing subsystem, transmitting autonomous information signals from the second signal processing subsystem to the first signal processing subsystem indicating the attenuation value for the twisted-pair cable, and at the first signal processing subsystem, amplifying the downconverted first RF communication signals prior to transmission over the twisted-pair cable.

In one form of the invention, the step of amplifying includes providing a programmable amplifier having a programmable gain-versus-frequency characteristic acting to compensate for frequency dependent attenuation characteristics of the twisted-pair cable. The method may further include the step of programming the gain of the programmable amplifier in accordance with the attenuation value for the twisted-pair cable.

In another aspect of the invention, the method further includes the steps of, at the second signal processing subsystem, downconverting second RF communication signals to provide downconverted second RF communication signals, transmitting the downconverted second RF communication signals to the first signal processing subsystem over a second twisted-pair cable, and, at the first signal processing subsystem, upconverting the downconverted second RF communication signals to provide recovered second RF communication signals.

In another embodiment of the invention, an RF communication signal distribution apparatus comprises a first signal processing subsystem including means for receiving first RF communication signals, means for downconverting the first RF communication signals to provide downconverted first RF communication signals, means for transmitting the downconverted first RF communication signals to a second signal processing subsystem over a first twisted-pair cable, means for providing operating power for the second signal processing subsystem from the first signal processing subsystem. The second signal processing subsystem includes means for upconverting the downconverted first RF communication signals to provide recovered first RF communication signals, means for transmitting the recovered first RF communication signals over an antenna, and means for determining an event occurring at the second signal processing subsystem and transmitting autonomous information signals thereabout to the first signal processing subsystem. The means for downconverting first RF communication signals to provide downconverted first RF communication signals comprises means for providing the first RF communication signals to a mixer at a first input port, means for providing a local oscillator signal to the mixer at a second input port, means for providing a mixer output signal at a mixer output port, and means for filtering the mixer output signal to provide downconverted first communication signals in a frequency band below 100 MHz.

The means for providing a local oscillator signal comprises means for providing a reference signal to a frequency synthesizer and means for programming the frequency synthesizer to generate a local oscillator signal of predetermined frequency.

In one form, the RF communication signal distribution apparatus further comprises means for transmitting, to the second signal processing subsystem, a sample of the reference signal for frequency control at the second signal processing subsystem. The sample of the reference signal is a sample of a reference oscillator signal at a predetermined amplitude.

In another form, the RF communication signal distribution apparatus further comprises means for measuring, at the second signal processing subsystem, amplitude of the reference oscillator signal sample to provide a measured amplitude of the reference oscillator signal sample, and means for comparing the measured amplitude of the reference oscillator signal sample and the predetermined amplitude of the reference oscillator signal sample to determine an attenuation value for the twisted-pair cable.

In another form, the RF communication signal distribution apparatus further comprises, at the second signal processing subsystem, means for transmitting autonomous information signals from the second signal processing subsystem to the first signal processing subsystem indicating the attenuation value for the twisted-pair cable, and at the first signal processing subsystem, means for amplifying the downconverted first RF communication signals prior to transmission over the twisted-pair cable. The means for amplifying comprises programmable amplifier means having a programmable gain-versus-frequency characteristic acting to compensate for frequency dependent attenuation characteristics of the twisted-pair cable. The apparatus further includes means for programming the gain of the programmable amplifier in accordance with the attenuation value for the twisted-pair cable.

In another form, the RF communication signal distribution apparatus further comprises, at the second signal processing subsystem, means for downconverting second RF communication signals to provide downconverted second RF communication signals, means for transmitting the downconverted second RF communication signals to the first signal processing subsystem over a second twisted-pair cable, and, at the first signal processing subsystem, means for upconverting the downconverted second RF communication signals to provide recovered second RF communication signals. The means for downconverting the first RF communication signals comprises a mixer having an RF signal input, a local oscillator input, and an RF signal output. The RF signal output is filtered to yield downconverted first RF communication signals in a frequency band below 100 MHz.

The means for transmitting the downconverted first communication signals comprises a single-ended to balanced line converter driving a twisted-pair cable. The single-ended to balanced line converter comprises a balun transformer.

In another aspect of the invention, the means for providing operating power comprises locating a DC power supply at the first signal processing subsystem and transmitting DC power over electrical conductors to the second signal processing subsystem. The electrical conductors preferably comprise the first twisted-pair cable.

In yet another form of the invention, the means for upconverting the downconverted first RF communication signals comprises a mixer having an RF signal input, a local oscillator input, and an RF signal output. The means for transmitting autonomous information signals to the first signal processing subsystem comprises transmitting out-of-band signals from the second signal processing subsystem to the first signal processing subsystem over a second twisted-pair cable. The out-of-band signals may comprise low-speed digital signals. The autonomous information signals comprise indicia of an event detected at the second signal processing subsystem.

In another aspect of the invention, an RF communication signal distribution system comprises an RF communication signal interface coupled to a first signal processing subsystem, the RF communication signal interface receiving first RF communication signals and transmitting second RF communication signals.

The first signal processing subsystem includes a mixer operatively coupled to the interface for receiving the first RF communication signals and coupled to means for generating a local oscillator signal provided thereat, the mixer providing downconverted first RF communication signals in a frequency band below 100 MHz, a single-ended to balanced line converter operatively coupled to the mixer for receiving the downconverted first RF communication signals at an input end thereof, a first twisted-pair cable coupled to the output end of the converter, and a power interface network having an output coupled to the first twisted-pair cable and an input coupled to a DC power supply. The second signal processing subsystem includes a second power interface network having an input coupled to the first twisted-pair cable, a balanced line to single-ended converter operatively coupled to the first twisted-pair cable, a mixer operatively coupled to the balanced line to single-ended converter to provide downconverted first communication signals to the mixer, the mixer coupled to means for generating a local oscillator signal provided thereat, the mixer providing recovered first RF communication signals, an antenna operatively coupled to the recovered first RF communication signals, and an information signal source having an output coupled to a second twisted-pair cable, the second twisted-pair cable terminating at the first signal processing subsystem for conveying autonomous information signals from the first signal processing subsystem to the second signal processing subsystem. The system may further comprise, at the second signal processing subsystem, second RF communication signals from the antenna coupled to a mixer, the mixer operatively coupled to a local oscillator, the mixer providing downconverted second RF communication signals in a frequency band below 100 MHz, and a single-ended to balanced line converter operatively coupled to the downconverted second RF communication signals and to the second twisted-pair cable.

Further objects, features and advantages of the present invention will become apparent from the following description and drawings.

BRIEF DESCRIPTION OF THE DRAWINGS

FIG. 1 illustrates an RF communication signal distribution system for use inside a structure;

FIG. 2 is a block diagram of an RF communication signal distribution system in accordance with the present invention;

FIG. 3 is a block diagram of a first signal processing subsystem in accordance with the present invention;

FIG. 4 is a block diagram of a second signal processing subsystem in accordance with the present invention;

DETAILED DESCRIPTION OF THE INVENTION

Figure 5:
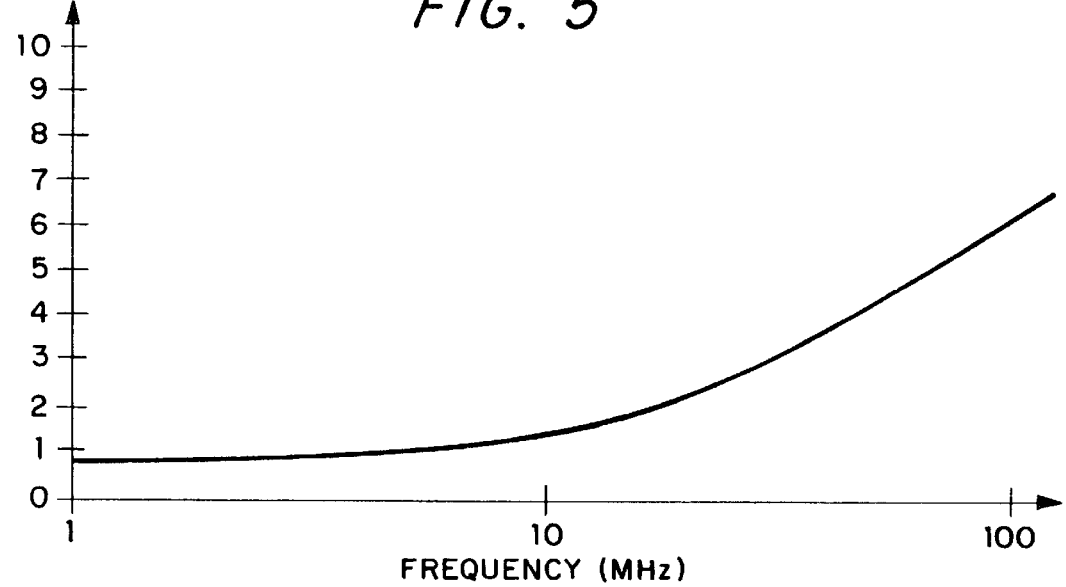
FIG. 5 illustrates the attenuation-versus-frequency characteristic of a twisted-pair cable.

In accordance with the present invention, an RF communication signal distribution system and method are described that provide distinct advantages when compared to those of the prior art. The invention can best be understood with reference to the accompanying drawing figures.

FIG. 1 illustrates a structure, such as a building 101, in which communication units, such as portable communication units 102, are effectively prevented from receiving RF communication signals 103 at an adequate signal level directly from an external site, such as a proximate or local cell site 104, by the metal building superstructure (or other obstacle). In order to permit communication units 102 within the building 101 to communicate with the local cell site 104, an in-building RF communication signal distribution system is provided.

RF communication signals 103 from the cell site 104 are received through an outside antenna, such as a roof-top antenna 105, and the signals are routed to an RF communication signal interface 106 that may comprise a cellular transceiver and appropriate signal distribution networks. Of course, even though the aforementioned RF communication signal distribution system has been described in the context of a cellular system, the RF communication signal distribution system would work equally well in conjunction with a trunked system, a conventional two-way (or paging) system, or a PCS (Personal Communication System), among others. In addition, the signal pathway between the local cell site 104 and the RF communication signal interface 106 is depicted in FIG. 1 as an over-the-air signal pathway, requiring antennas at both ends. However, the system would also function properly if RF signals from an external RF communication system site, such as the cell site 104, were provided over coaxial cable, fiber optic cable, or a microwave link, for example, even though these variants are not shown in FIG. 1.

From the RF communication signal interface 106, the RF communication signals 103 received from the cell site 103, which may be termed first RF communication signals, are distributed to remote antenna units 108 that are installed throughout the building 101 in appropriate locations, such as suspended from ceilings or walls, for example, to provide adequate signal levels such that communication units 102 within the building 101 can communicate with the local cell site 104. These remote antenna units 108 may be termed second signal processing subsystems. These second signal processing subsystems 108 are connected by twisted-pair cable 109 to first signal processing subsystems, or head-end units 107, that are in turn coupled to the RF communication signal interface 106. Both the first 107 and second 108 RF communication signal processing subsystems will be described in detail subsequently.

The first signal processing subsystem 107 downconverts the received first RF communication signals and transmits these downconverted signals over a twisted-pair cable 109 to the second signal processing subsystem 108. The second signal processing subsystem 108 upconverts these transmitted signals to provide recovered first RF communication signals that have been restored to their original frequency. These recovered signals are then transmitted over an antenna 110 that is a part of the second signal processing subsystem 108, so that the signals can be received by a communication unit 102 that is within the building 101.

The communication unit may also transmit second RF communication signals back to the cell site 104. These second RF communication signals are downconverted by the remote antenna unit 108 (or second signal processing subsystem) and transmitted back to the first signal processing subsystem 107. These downconverted second RF communication signals are upconverted to provide recovered second RF communication signals and are transmitted 112 back to the cell site 104. This transmission of downconverted second RF communication signals back to the first signal processing subsystem may be accomplished over a second twisted-pair cable 203 (FIG. 2).

FIG. 2 shows that the first RF communication signals are coupled to the first signal processing subsystem, or head end 107, via a coaxial cable 201. The first RF communication signals are frequency translated, in a fashion to be described below, and transmitted to the second signal processing subsystem, or remote antenna unit 108, via the first twisted-pair cable 109. The first RF communication signals are then frequency translated back to their original frequency by the second signal processing subsystem 108 and transmitted over an antenna 110. Although the antenna 110 is preferably part of the remote antenna unit 108, the antenna may also be a separate element without loss of utility, and it may be possible to couple more than one antenna to the second signal processing subsystem to enhance system coverage inside the structure.

The RF signal distribution system is generally intended to extend in-building coverage for a two-way system, such as a cellular telephone communication system. Thus, the antenna 110 may also receive signals transmitted by a communication unit 102, frequency translate these signals, and transmit the translated signals back to the head end, or first signal processing subsystem 107, over a second twisted-pair cable 203. These second RF communication signals may then be frequency translated back to their original frequency to provide recovered second RF communication signals that can then be coupled to the RF communication signal interface 106 via coaxial cable 202 for return transmission to the external communication system with which the communication unit 102 is in contact. Of course, even though the foregoing discussion of the RF communication signal distribution system has centered on extension of coverage inside a structure, the system is equally applicable to extension of coverage to a construction site, inside a highway or railway tunnel, or other areas where coverage extension is desired.

FIG. 3 illustrates the components of the first signal processing subsystem 107 in block diagram form. The first RF communication signals from the RF communication signal interface are coupled to the first signal processing subsystem 107 via a coaxial cable 201 or other suitable transmission medium. These first RF communication signals are other termed down-link signals because they are directed from a communication system central site "down" to a mobile or portable communication unit. The following discussion will describe operation of the RF signal distribution system in conjunction with a cellular system, although other types of systems, as discussed previously, may also be served by the RF communication signal distribution system in accordance with the present invention. Pertinent operating frequencies would, of course, generally have to be altered to accommodate interconnection with a different type of communication system.

The first RF communication signals are filtered in a bandpass filter 301 centered about the frequency band of interest. For a cellular system, the bandpass filter would filter a frequency band from about 869 to about 894 MHz (megahertz). The filtered signal is then coupled to a mixer 302. In the preferred embodiment, the mixer is provided with an 800 MHz local oscillator signal that is generated by, and is the output of, a frequency synthesizer 311 under control of a microcomputer 312. Such signal generation and interconnection is well-known in the art.

The frequency synthesizer 311 is supplied with a reference signal, as from a reference oscillator 310, for frequency control purposes. In the preferred embodiment, the reference signal is a 12.8 MHz reference signal provided by the reference oscillator 310. This reference oscillator signal will be discussed in more detail below.

Mixing the first RF communication signals with the 800 MHz local oscillator signal produced by the frequency synthesizer 311 yields downconverted first RF communication signals in the frequency range from about 69 to 94 MHz, after passage through a bandpass filter 303 designed to pass the 69 to 94 MHz band. These downconverted first RF communication signals are then applied to a programmable gain amplifier 304, the operation of which will be described in greater detail below.

The amplified downconverted RF communication signals and a sample of the reference signal output by the oscillator are coupled to a combiner 305. In its simplest form, this combiner 305 is a combination of bandpass filters designed to prevent unwanted interaction of the reference oscillator 310 with the downconverted first RF communication signals.

The output of the combiner 305 is then coupled to a single-ended to balanced line converter 306. In its simplest form, the single-ended to balanced line converter may be a balun transformer designed to match the impedance of the RF network within the first signal processing subsystem (about 50 ohms) to the impedance of the balanced, twisted-pair cable (about 100 ohms). The term "balun" is a contraction derived from the phrase "balanced to unbalanced," and design of such circuit elements is well-known in the art. The particular single-ended to balanced line converter utilized in the preferred embodiment will be treated in detail later. The output of the converter 306 is applied to the first twisted-pair cable 109.

Coupled to the single-ended to balanced line converter 306 is a power interface network 307 designed to couple operating power from a DC (direct current) power supply 308, at the first signal processing subsystem, to provide DC power for operating the circuitry of the second signal processing subsystem. Of course, power supply designs are well-known in the art, and the preferred method of coupling an isolated power supply to a balanced line will be discussed in detail in a subsequent section. Where, as here, the power is preferably transmitted to the second signal processing subsystem over the same twisted pair cable used to carry the RF signals, the power supply 308 should be isolated (have no ground reference) because connecting the ground references of the first and second signal processing subsystems could cause longitudinal currents to develop in the twisted-pair cable and have an adverse impact on both noise immunity and RF interference. Of course, it is possible to transmit operating power through an additional pair of conductors, rather than using the same twisted-pair that is utilized for the transmission of the first RF communication signals, although it is clearly advantageous to use the same twisted-pair cable.

Thus, the output of the converter 306 and power interface 307 comprises the first downconverted RF communication signals at a controlled amplitude, a sample of the reference oscillator signal at a predetermined amplitude (for controlling frequency at the second signal processing subsystem and for determining attenuation), and the operating power supply for the second signal processing substation, and all are transmitted over the first twisted-pair cable.

The first signal processing subsystem must also generally provide for the reception of signals from the second signal processing subsystem. Accordingly, a balanced input 313 from a second twisted-pair cable 203 (FIG. 2) is provided for receiving downconverted second RF communication signals transmitted by the second signal processing subsystem.

Since the second twisted-pair cable is also a balanced line, a balanced line to single-ended converter 314 is provided for proper matching to the single-ended input of the first signal processing subsystem 107. Coupled to the balanced line to single-ended converter 314 is a signalling interface 315 used to couple received out-of-band autonomous signalling from the second signal processing subsystem to the microcomputer 312. Although this signalling feature will be discussed below in conjunction with the description of the second signal processing subsystem, it should be noted that the preferred signalling method is via a Bell 103 compatible modem. Thus, the signalling interface 315 need only provide a proper impedance match, since commercially available modem IC's (integrated circuits) are generally designed to drive a 600 ohm balanced line. These commercially available modem IC's can also be interfaced with the microcomputer 312 in a known manner.

The downconverted second RF communication signals received from the second signal processing subsystem are then applied to a bandpass filter 316 that covers the appropriate frequency range. In the preferred embodiment of the invention, the second signal processing subsystem downconverts the second RF communication signals (which, for a cellular system, occupy a frequency band from about 824 to about 849 MHz) to a frequency band from about 24 to 49 MHz. Consequently, the bandpass filter 316 is designed to filter the 24 to 49 MHz band.

The output of the bandpass filter 316 is coupled to an amplifier stage 317, and then to a mixer 318. This second mixer 318 upconverts the downconverted second RF communication signals, through mixing with an 800 MHz local oscillator signal from the frequency synthesizer 311, to provide recovered second RF communication signals in their original frequency range (824 to 849 MHz). These recovered signals are filtered through an 824 to 849 MHz bandpass filter 319 to form the cellular uplink signals that are coupled back to the RF communication signal interface via coaxial cable 202 for retransmission to the cell site.

FIG. 4 is a block diagram of the remote antenna unit or second signal processing subsystem 108. Downconverted first RF communication signals transmitted down the first twisted-pair cable 109 are received at the balanced input 401 of a balanced line to single-ended converter 402, which may be a balun transformer of known construction. Coupled to the balanced line to single-ended converter 402 is a power interface network 403 that receives DC power, as from the twisted-pair cable 109. The received DC power is then coupled to a local power supply 404 for distribution of operating power 405 to the circuit elements of the second signal processing subsystem. The power supply 404 may be a switching power supply as known in the art if various regulated DC voltages are required for operation of the second signal processing subsystem circuitry, or the power supply 405 may simply be a linear voltage regulator, also well-known.

The output of the balanced line to single-ended converter 403 is coupled to a splitter 406 for separation of the downconverted first RF communication signals and the reference oscillator sample transmitted from the first signal processing subsystem. The splitter 406 may be implemented as bandpass filters for the appropriate frequencies. The reference oscillator sample is coupled, for accuracy of frequency control, to a frequency synthesizer 418 that is then used for downconversion and recovery of RF communication signals. Since the same reference oscillator signal (representative of the output of the referenced oscillator 310) is used throughout the RF signal distribution system, frequency accuracy is maintained at a high level.

The downconverted first RF communication signals are coupled through an amplifier 407 to a mixer 408, where the downconverted signals are mixed with an 800 MHz local oscillator signal derived from the frequency synthesizer 418. The mixer output is filtered through a bandpass filter covering the frequency range from about 869 to 894 MHz to yield recovered first RF communication signals that are amplified by an amplifier 422 and then applied to a duplexer 410. The duplexer, as well-known, allows a single antenna 110 to be used for both transmitting and receiving by providing proper isolation between transmit and receive signal paths.

The antenna 110 transmits the recovered first RF communication signals into the coverage zone that the remote antenna unit 108 is designed to cover.

The antenna 110 also receives second RF communication signals from communication units within the coverage zone. These received second RF communication signals are coupled through the duplexer 410 to an amplifier stage 411 and into a mixer 412. The mixer 412 mixes the second RF communication signals (which are in a band from about 824 to 849 MHz) with an 800 MHz local oscillator signal derived from the frequency synthesizer 418. The output signals from the mixer 412 are filtered in a bandpass filter 413 that filters the frequency range from about 24 to 49 MHz to provide downconverted second RF communication signals that are amplified by an amplifier 414 and applied to a single-ended to balanced line converter 415 for transmission from the balanced output of the converter 415 over the second twisted-pair cable 203 (FIG. 2).

As will be noted from an examination of the signal processing subsystems of FIGS. 3 and 4, the first signal processing subsystem 107 has an amplifier 304 that is used to amplify the downconverted first RF communication signals prior to transmission. This amplifier 304 is under control of the microcomputer 312 so that the gain of the amplifier 304 can be selected by the microcomputer to compensate for attenuation introduced by the first twisted-pair cable. Similarly, the second signal processing subsystem 108 includes a programmable gain amplifier 414 that is used to amplify the downconverted second RF communication signals prior to transmission over the second twisted-pair cable. The gain of this second programmable gain amplifier 414 can be selected by microcomputer 419.

Use of these programmable gain stages is made desirable by the attenuation-versus-frequency characteristics of typical twisted-pair cable. FIG. 5 illustrates the attenuation-versus-frequency curve of a typical twisted-pair cable; in this case UTP350 Category 5 LAN (local area network) cable, available from Belden Corporation as Belden Part Number SM1700A "Datatwist 350" cable.

As will be noted from an examination of FIG. 5, the slope of the attenuation curve between 10 and 100 MHz is fairly steep, such that the end frequencies in a band of interest, such as the band from about 69 to 94 MHz occupied by the downconverted first RF communication signals, will be attenuated by different amounts. This slope of the attenuation-versus-frequency characteristic can be counteracted by designing the programmable amplifiers 304 and 414 such that the gain-versus-frequency characteristics of these amplifiers exactly compensate for the slope of the attenuation-versus-frequency characteristic of the cable.

However, the proper gain to be applied depends upon the attenuation, and therefore the length, of the twisted-pair cable used for a particular installation. This overall attenuation figure is difficult to obtain at installation time, both because installation is presumably accomplished by unskilled installers, and because the cable being used may already be a part of the building wiring scheme, making its exact length difficult to ascertain.

Consequently, the second signal processing subsystem utilizes the fact that the reference oscillator sample is applied to the first twisted-pair cable, at the head end, at a predetermined, fixed amplitude, to measure the attenuation introduced by the cable. FIG. 4 illustrates that the reference oscillator sample 420 is also applied to the microcomputer 419 for measurement of signal amplitude. In the preferred embodiment, this measurement is effected by an A-to-D (analog-to-digital) converter built in to the microcomputer unit. In the alternative, the A-to-D could be external to the microcomputer unit. It is also possible to use the DC voltage drop of the twisted-pair cable, by measuring the operating power at the second signal processing subsystem, to determine attenuation of the twisted-pair cable.

Once this measurement is complete, the microcomputer 419 compares the measured value of the signal with the known, predetermined amplitude at which the reference oscillator signal was transmitted. Based upon this comparison, the microcomputer 419 determines the amount by which the cable has attenuated the reference signal, and programs the gain of the amplifier 414 to compensate for this twisted-pair cable attenuation.

The microcomputer 419 also transmits this attenuation information autonomously back to the first signal processing subsystem over the second twisted-pair cable. As described previously, the microcomputer 419 is coupled to a signalling interface over an appropriate signal pathway 423. In the preferred embodiment of the invention, the signalling interface 416 is a Bell 103 compatible low-speed modem designed for exchange of low-speed digital signals. Since many microcomputers have built-in serial communication ports, the signal pathway 423 to the modem IC 416 is easy to establish. Even without a built-in serial port, structuring such an interface based upon undedicated inputs and outputs from a microcomputer port is well-understood in the art. The microcomputer 312 at the first signal processing subsystem 107 then uses this attenuation value to program a similar programmable gain amplifier 304 used to amplify the downconverted first RF communication signals, selecting the gain to compensate for the attenuation of the twisted-pair cable.

In addition, the signalling tones produced by a Bell 103 compatible modem are in the vicinity of 1 KHz (kilohertz), and are thus well out of band with respect to the RF signals being communicated over the twisted-pair cable. They are also low in amplitude, while still remaining detectable by a corresponding modem 315 at the first signal processing subsystem 107 (FIG. 3).

While serving to communicate autonomous information signals indicative of the attenuation value, the out of band signalling capability may also be used to transmit status information or alarm signals from the second signal processing subsystem 108 to the first signal processing subsystem. For example, a synthesizer out-of-lock signal 421 can be detected by the microcomputer 419 and transmitted. Other signals, such as loss of reference oscillator, loss of RF signal, or even a response to the detection of a locally-generated alarm signal (smoke alarm, tamper alarm, loss of DC power, etc.) could also be autonomously transmitted. Of course, the detection and transmission of a DC power loss condition would require some form of back-up power, such as a battery, that is not shown in FIG. 3.

Figure 6:
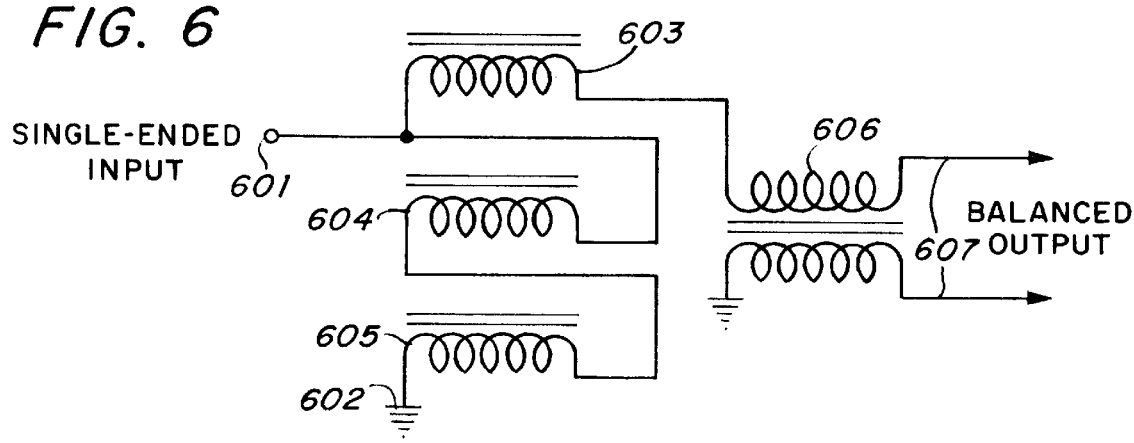
FIG. 6 is a schematic diagram of a single-ended to balanced line converter.

FIG. 6 is a schematic diagram of a balun transformer suitable for converting a 50 ohm single-ended input to a 100 ohm balanced output. In this implementation, the 50 ohm single-ended input is applied between the input terminal 601 of the balun and ground 602. A series of mutually coupled inductors 603–605, preferably implemented as a trifilar winding on a toroidal core, is in turn coupled to a transformer 606, preferably wound on a second toroidal core. The transformer 606 provides a balanced output 607 suitable for driving a 100 ohm balanced line. Of course, single-ended to balanced line conversion can also be accomplished through the use of active devices, as is well-known in the art.

Figure 7:
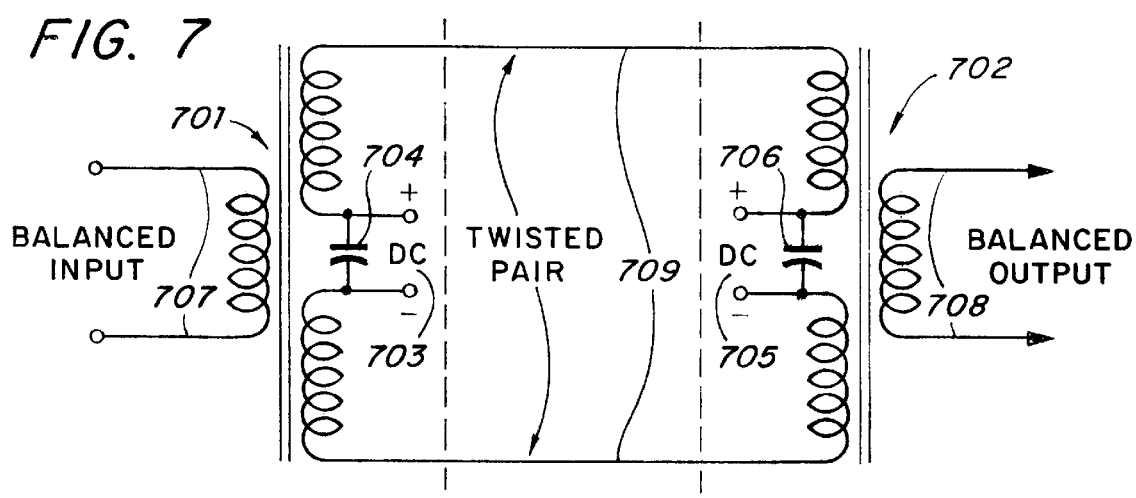
FIG. 7 depicts transmission of DC power down a balanced transmission line.

In the event that DC power is to be transmitted down a balanced line, a slightly more complex arrangement is beneficial, as illustrated in FIG. 7. In this implementation, a transformer 701 having a split secondary has its input 707 coupled to the balanced output of a preceding balun or coupling network. A capacitor 704 connects the split secondary at the point where an isolated DC supply 703 is connected.

At the other end of an intervening twisted-pair cable 709, a similarly configured transformer 702 allows the differential mode DC voltage 705 to be picked off across a capacitor 706 connecting the split secondary of the transformer 702. The transformer primary 708 is then coupled to the balanced input of the receiving equipment. This arrangement allows DC power to be transferred between equipments that do not share a common ground.

There have been described herein an RF communication signal distribution system and method that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for distributing RF communication signals, the method comprising the steps of:
   at a first signal processing subsystem at a first location:
   (a) receiving first RF communication signals;
   (b) downconverting said first RF communication signals to provide downconverted first RF communication signals;
   (c) transmitting the downconverted first RF communication signals to a second signal processing subsystem at a second location remote from the first location over a first twisted-pair cable;
   (d) providing operating power for the second signal processing subsystem from the first signal processing subsystem;
   at the second signal processing subsystem:
   (e) upconverting said downconverted first RF communication signals to provide recovered first RF communication signals;
   (f) transmitting said recovered first RF communication signals over an antenna; and
   (g) determining an event occurring at said second signal processing subsystem and transmitting autonomous information signals thereabout to the first signal processing subsystem.

2. The method in accordance with claim 1, wherein the step of downconverting first RF communication signals to provide downconverted first RF communication signals comprises the steps of:
   (a) providing said first RF communication signals to a mixer at a first input port;
   (b) providing a local oscillator signal to the mixer at a second input port;
   (c) providing a mixer output signal at a mixer output port; and (d) filtering the mixer output signal to provide downconverted first communication signals in a frequency band below 100 MHz.

3. The method in accordance with claim 2, wherein the step of providing a local oscillator signal further comprises the steps of:
   (a) providing a reference signal to a frequency synthesizer; and
   (b) programming the frequency synthesizer to generate a local oscillator signal of predetermined frequency.

4. The method in accordance with claim 3, further including the step of transmitting, to the second signal processing subsystem, a sample of said reference signal for frequency control at said second signal processing subsystem.

5. The method in accordance with claim 4, wherein said sample of a reference signal is a sample of a reference oscillator signal at a predetermined amplitude.

6. The method in accordance with claim 5, further including the steps of:
   (a) measuring, at the second signal processing subsystem, the amplitude of the reference oscillator signal sample to provide a measured amplitude of the reference oscillator signal sample; and
   (b) comparing the measured amplitude of the reference oscillator signal sample and the predetermined amplitude of the reference oscillator signal sample to determine an attenuation value for the twisted-pair cable.

7. The method in accordance with claim 6, further including the steps of:
   at the second signal processing subsystem:
      (a) transmitting autonomous information signals from the second signal processing subsystem to the first signal processing subsystem indicating said attenuation value for the twisted-pair cable; and
   at the first signal processing subsystem:
      (b) amplifying said downconverted first RF communication signals prior to transmission over said twisted-pair cable.

8. The method in accordance with claim 7, wherein the step of amplifying includes providing a programmable amplifier having a programmable gain-versus-frequency characteristic acting to compensate for frequency dependent attenuation characteristics of the twisted-pair cable.

9. The method in accordance with claim 8, further including the step of programming the gain of said programmable amplifier in accordance with said attenuation value for the twisted-pair cable.

10. The method in accordance with claim 1, further including the steps of:
    at the second signal processing subsystem:
       (h) downconverting second RF communication signals to provide downconverted second RF communication signals;
       (i) transmitting said downconverted second RF communication signals to the first signal processing subsystem over a second twisted-pair cable;
    at the first signal processing subsystem:
       (j) upconverting said downconverted second RF communication signals to provide recovered second RF communication signals.

11. An RF communication signal distribution apparatus comprising:
    a first signal processing subsystem at a first location including:
       means for receiving first RF communication signals;
       means for downconverting said first RF communication signals to provide downconverted first RF communication signals;
       means for transmitting said downconverted first RF communication signals to a second signal processing subsystem at a second location remote from the first location over a first twisted-pair cable;
       means for providing operating power for the second signal processing subsystem from the first signal processing subsystem;
    said second signal processing subsystem including:
       means for upconverting said downconverted first RF communication signals to provide recovered first RF communication signals;
       means for transmitting said recovered first RF communication signals over an antenna; and
       means for determining an event occurring at said second signal processing subsystem and transmitting autonomous information signals thereabout to said first signal processing subsystem.

12. The RF communication signal distribution apparatus of claim 11, wherein the means for downconverting first RF communication signals to provide downconverted first RF communication signals comprises:
    means for providing said first RF communication signals to a mixer at a first input port;
    means for providing a local oscillator signal to the mixer at a second input port;
    means for providing a mixer output signal at a mixer output port; and
    means for filtering the mixer output signal to provide downconverted first communication signals in a frequency band below 100 MHz.

13. The RF communication signal distribution apparatus of claim 12, wherein the means for providing a local oscillator signal comprises:
    means for providing a reference signal to a frequency synthesizer; and
    means for programming the frequency synthesizer to generate a local oscillator signal of predetermined frequency.

14. The RF communication signal distribution apparatus of claim 13, further comprising means for transmitting, to the second signal processing subsystem, a sample of said reference signal for frequency control at said second signal processing subsystem.

15. The RF communication signal distribution apparatus of claim 14, wherein said sample of a reference signal is a sample of a reference oscillator signal at a predetermined amplitude.

16. The RF communication signal distribution apparatus of claim 15, further comprising:
    means for measuring, at the second signal processing subsystem, amplitude of the reference oscillator signal sample to provide a measured amplitude of the reference oscillator signal sample; and
    means for comparing the measured amplitude of the reference oscillator signal sample and the predetermined amplitude of the reference oscillator signal sample to determine an attenuation value for the twisted-pair cable.

17. The RF communication signal distribution apparatus of claim 16, further comprising:
    at the second signal processing subsystem:
       means for transmitting autonomous information signals from the second signal processing subsystem to the first signal processing subsystem indicating said attenuation value for the twisted-pair cable; and at the first signal processing subsystem:
   means for amplifying said downconverted first RF communication signals prior to transmission over said twisted-pair cable.

18. The RF communication signal distribution apparatus of claim 17, wherein the means for amplifying comprises programmable amplifier means having a programmable gain-versus-frequency characteristic acting to compensate for frequency dependent attenuation characteristics of the twisted-pair cable.

19. The RF communication signal distribution apparatus of claim 18, further including means for programming the gain of said programmable amplifier in accordance with said attenuation value for the twisted-pair cable.

20. The RF communication signal distribution apparatus of claim 11, further comprising:
   at the second signal processing subsystem:
      means for downconverting second RF communication signals to provide downconverted second RF communication signals;
      means for transmitting said downconverted second RF communication signals to the first signal processing subsystem over a second twisted-pair cable;
   at the first signal processing subsystem:
      means for upconverting said downconverted second RF communication signals to provide recovered second RF communication signals.

21. The RF communication signal distribution apparatus of claim 11, wherein the means for downconverting the first RF communication signals comprises a mixer having an RF signal input, a local oscillator input, and an RF signal output.

22. The RF communication signal distribution apparatus of claim 21, wherein the RF signal output is filtered to yield downconverted first RF communication signals in a frequency band below 100 MHz.

23. The RF communication signal distribution apparatus of claim 21, wherein the means for transmitting the downconverted first communication signals comprises a single-ended to balanced line converter driving a twisted-pair cable.

24. The RF communication signal distribution apparatus of claim 23, wherein the single-ended to balanced line converter comprises a balun transformer.

25. The RF communication signal distribution apparatus of claim 21, wherein the means for providing operating power comprises locating a DC power supply at the first signal processing subsystem and transmitting DC power over electrical conductors to the second signal processing subsystem.

26. The RF communication signal distribution apparatus of claim 25, wherein said electrical conductors comprise the first twisted-pair cable.

27. The RF communication signal distribution apparatus of claim 21, wherein the means for upconverting the downconverted first RF communication signals comprises a mixer having an RF signal input, a local oscillator input, and an RF signal output.

28. The RF communication signal distribution apparatus of claim 21, wherein the means for transmitting autonomous information signals to the first signal processing subsystem comprises transmitting out-of-band signals from the second signal processing subsystem to the first signal processing subsystem over a second twisted-pair cable.

29. The RF communication signal distribution apparatus of claim 28, wherein the out-of-band signals comprise low-speed digital signals.

30. The RF communication signal distribution apparatus of claim 21, wherein the autonomous information signals comprise indicia of an event detected at the second signal processing subsystem.

31. An RF communication signal distribution system comprising:
   an RF communication signal interface coupled to a first signal processing subsystem at a first location, the RF communication signal interface receiving first RF communication signals and transmitting second RF communication signals;
   said first signal processing subsystem including:
      a mixer operatively coupled to the interface for receiving said first RF communication signals and coupled to means for generating a local oscillator signal provided thereat, the mixer providing downconverted first RF communication signals in a frequency band below 100 MHz;
      a single-ended to balanced line converter operatively coupled to the mixer for receiving said downconverted first RF communication signals at an input end thereof;
      a first twisted-pair cable coupled to the output end of said converter;
      a power interface network having an output coupled to said first twisted-pair cable and an input coupled to a DC power supply;
   a second signal processing subsystem at a second location remote from the first location including:
      a second power interface network having an input coupled to the first twisted-pair cable;
      a balanced line to single-ended converter operatively coupled to the first twisted-pair cable;
      a mixer operatively coupled to the balanced line to single-ended converter to provide downconverted first communication signals to the mixer, the mixer coupled to means for generating a local oscillator signal provided thereat, the mixer providing recovered first RF communication signals;
      an antenna operatively coupled to the recovered first RF communication signals; and
      an information signal source having an output coupled to a second twisted-pair cable, the second twisted-pair cable terminating at the first signal processing subsystem for conveying autonomous information signals from the first signal processing subsystem to the second signal processing subsystem.

32. The RF communication signal distribution system of claim 31, further comprising:
   at said second signal processing subsystem:
      second RF communication signals from the antenna coupled to a mixer, the mixer operatively coupled to a local oscillator, the mixer providing downconverted second RF communication signals in a frequency band below 100 MHz; and
      a single-ended to balanced line converter operatively coupled to the downconverted second RF communication signals and to the second twisted-pair cable.

* * * * *